US008873862B2

(12) United States Patent
Iwabuchi

(10) Patent No.: US 8,873,862 B2
(45) Date of Patent: Oct. 28, 2014

(54) PRODUCT IMAGE PROCESSOR, PRODUCT IMAGE PROCESSING METHOD, INFORMATION RECORDING MEDIUM, AND PROGRAM

(75) Inventor: Shigaku Iwabuchi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/128,256

(22) PCT Filed: Jun. 28, 2011

(86) PCT No.: PCT/JP2011/064761
§ 371 (c)(1),
(2), (4) Date: Dec. 20, 2013

(87) PCT Pub. No.: WO2013/001599
PCT Pub. Date: Jan. 3, 2013

(65) Prior Publication Data
US 2014/0185935 A1    Jul. 3, 2014

(51) Int. Cl.
G06K 9/46  (2006.01)
G06K 9/66  (2006.01)
G06K 9/40  (2006.01)
G06T 7/40  (2006.01)
G06K 9/62  (2006.01)
G06T 1/00  (2006.01)

(52) U.S. Cl.
CPC ............ *G06K 9/6232* (2013.01); *G06T 7/408* (2013.01); *G06T 1/0007* (2013.01)
USPC .......................................... 382/190; 382/260

(58) Field of Classification Search
None
See application file for complete search history.

(56) References Cited

U.S. PATENT DOCUMENTS 5,146,510 A * 9/1992 Cox et al. ...................... 382/143
5,237,621 A * 8/1993 Cox et al. ...................... 382/143
5,537,670 A * 7/1996 Cox et al. ...................... 382/219

(Continued)

FOREIGN PATENT DOCUMENTS

JP    09-270002 A    10/1997
JP    2001-078074 A    3/2001

(Continued)

OTHER PUBLICATIONS

Stollnitz, E.J., Reproducing Color Images with Custom Inks, 1998, Doctural dissertation, University of Washington, pp. 1-116.*

(Continued)

*Primary Examiner* — Stephen R Koziol
*Assistant Examiner* — Jonathan S Lee
(74) *Attorney, Agent, or Firm* — Sughrue Mion, PLLC

(57) ABSTRACT

In order to obtain feature images representing features of products from product images, in a product image processor (101), a receiver (102) receives product images each representing one product in a group of products with a common composition; a calculator (103) calculates a degree of scattering of pixel values at each of the positions in the composition from a pixel value at each of the positions in each of the received product images; a generator (104) generates a filter with a degree of transmittance defined at each of positions in the composition on the basis of a degree of scattering calculated at each of the positions; and an applicator (105) applies the generated filter to each of the received product images, thereby obtaining feature images, each representing a feature of each of the products.

9 Claims, 9 Drawing Sheets

(56) References Cited

U.S. PATENT DOCUMENTS

| | | | |
|---|---|---|---|
| 6,137,903 A * | 10/2000 | Dichter | 382/162 |
| 6,721,465 B1 | 4/2004 | Nakashima et al. | |
| 2001/0055414 A1 * | 12/2001 | Thieme | 382/135 |
| 2007/0127820 A1 * | 6/2007 | Sankar | 382/190 |
| 2008/0101691 A1 * | 5/2008 | Ameline et al. | 382/162 |
| 2009/0220172 A1 | 9/2009 | Wajs | |
| 2009/0274393 A1 * | 11/2009 | Patel et al. | 382/298 |
| 2010/0026801 A1 | 2/2010 | Williams et al. | |

FOREIGN PATENT DOCUMENTS

| | | |
|---|---|---|
| JP | 2009-512038 A | 3/2009 |
| JP | 2009-140058 A | 6/2009 |
| JP | 2010-041725 A | 2/2010 |

OTHER PUBLICATIONS

Ferrari, V., Tuytelaars, T., and Van Gool, L., Wide-baseline Multiple-view Correspondences, 2003, IEEE Computer Society Conference on Computer Vision and Pattern Recognition, pp. 1-8.*

* cited by examiner

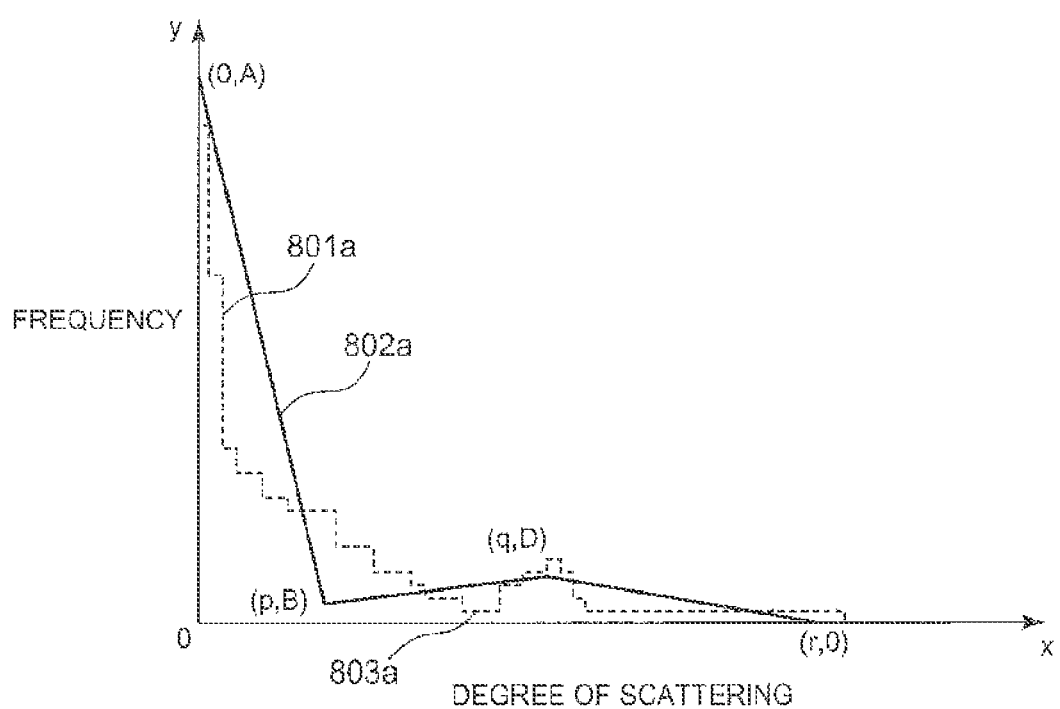

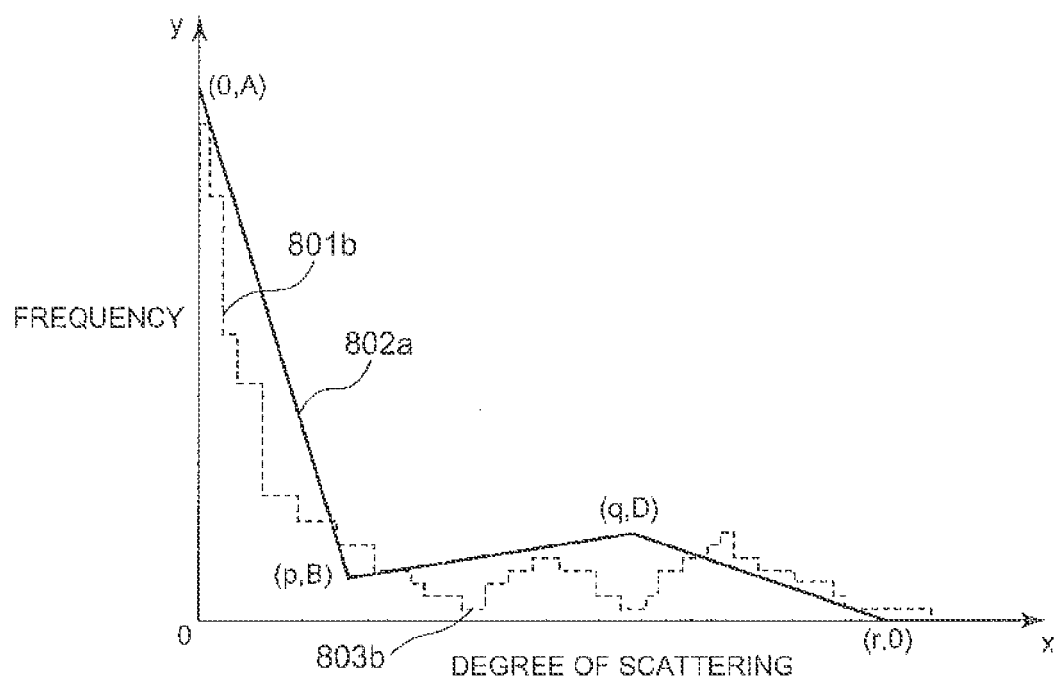

PRODUCT IMAGE PROCESSOR, PRODUCT IMAGE PROCESSING METHOD, INFORMATION RECORDING MEDIUM, AND PROGRAM

CROSS REFERENCE TO RELATED APPLICATIONS

This application is a National Stage of International Application No. PCT/JP2011/064761 filed Jun. 28, 2011, the contents of all of which are incorporated herein by reference in their entirety.

TECHNICAL FIELD

The present invention relates to a product image processor, a product image processing method, an information recording medium, and a program. The present invention specifically relates to an art of acquiring feature images, each representing a feature of each product within a group of products, from product images.

BACKGROUND ART

Various image processing arts to process an image obtained by photographing a product or drawing a product have been proposed.

For example, the undermentioned Patent Literature 1 proposes an art to separate an image of a product itself from an image of a product price where letters indicating the product price are drawn on the product image on a leaflet or the like.

Meanwhile, in products such as cosmetics and seasoning, containers having a similar appearance are often used, thereby making a brand image of the products consistent, and making the products more appealing. For example, products such as various colors of nail polish and various tastes of mayonnaise are often in the same shaped bottles.

Further, product images often employ a composition with a blank space around the products. In such a composition, the respective products are shown in the same orientation and size, and at the same position. That is, product images, each representing one product within a group of products, often employ a common composition in order to make a brand image of the products consistent.

PRIOR ART LITERATURE

Patent Literature

Patent Literature 1: Unexamined Japanese Patent Application Kokai Publication No. 2009-140058

DISCLOSURE OF THE INVENTION

Problem to be Solved by the Invention

Where such product images are displayed as thumbnails, a size of each product is exceedingly small. For example, in the above example, colors of nail polish that can be seen through bottles are different; and colors of mayonnaise that can be seen through bottles are similar and difficult to be differentiated although descriptions on labels attached to the bottles are different.

Therefore, an art is highly desired for obtaining feature images, each representing a feature of each product from product images, each representing each of a group of products, that is, in the above example, images in which colors of nail polish and letters on labels of mayonnaise can be easily seen.

The present invention is to solve the above problem, and an object of the invention is to provide a product image processor, a product image processing method, an information recording medium, and a program that are suitable for acquiring a feature image representing a feature of a product from a product image.

Means for Solving the Problem

A product image processor according to a first aspect of the present invention includes:

a receiver for receiving product images, each representing one product within a group of products with a common composition;

a calculator for calculating a degree of scattering of pixel values at each position in the common composition from a pixel value at each of the positions within the received product images;

a generator for generating a filter with a degree of transmittance defined at each position in the common composition on the basis of a degree of scattering calculated at each of the positions; and an applicator for applying the generated filter to each of the received product images, thereby obtaining feature images, each representing a feature of each of the products.

In the above product image processor, the degree of scattering can be a standard deviation, a variance, a maximum value, or a difference between the maximum value and a minimum value of a distance between each of the pixel values at the position and an average of the pixel values, or a maximum value of distances between the pixel values at the position.

In the above product image processor, the generator can be configured to set, as a degree of transmittance at each of positions in the common composition, a result obtained by applying a monotone increasing function to a degree of scattering calculated at each of the positions.

In the above product image processor, the generator can be configured to use the filter to smooth the degree of scattering calculated at each of the positions in the common composition, and then to apply the predetermined monotone increasing function to the degree of scattering.

In the above product image processor, the generator can be configured to dispose a predetermined size of a rectangular region at a position in the common composition so that the sum of degrees of scattering in the rectangular region is maximized, including the filter clipping the rectangular region.

In the above product image processor, the generator can be configured to perform curve-fitting so as to fit a curve to a histogram of the degrees of scattering, the curve represented by:

$$y=f(x)$$

where y is maximum at x=0, y is minimum at x=p, and y→0 at x→∞.

The generator can be configured to set, as a degree of transmittance at each of positions in the common composition, a result obtained by applying a monotone increasing function to a degree of scattering calculated at each of the positions, the monotone increasing function setting 0 to be the application result if an argument is less than p, setting 1 to be the application result if an argument is greater than or equal to p.

In the above product image processor, the curve is a polygonal line that passes through coordinates (0,A), (p,B), (q,C), (r,0) and (∞,0) in this order, and the generator can be configured to perform curve-fitting using A, B, C, p, q, r as fitting parameters.

The above product image processor further includes
a converter to extract feature points of the received product images, associate the extracted feature points among the product images, and subject the product images to affine transformation so as to minimize a degree of scattering at a position of the associated feature points in the composition, and
allows the calculator to perform calculation on the product images that were subjected to affine transformation.

A product image processing method according to a second aspect of the present invention includes:

a receiving step to receive product images, each representing one of the products in a group of products with a common composition;

a calculation step to calculate a degree of scattering of pixel values at each of the positions in the common composition from a pixel value at each of the positions in each of the received product images;

a generation step to generate a filter with a degree of transmittance defined at each of the positions in the common composition on the basis of a degree of scattering calculated at each of the positions; and an application step to apply the generated filter to each of the received product images to obtain feature images, each representing a feature of each of the products.

A non-transitory information recording medium according to a third aspect of the present invention has a program recorded thereon, the program causing a computer to function as:

a receiver for receiving product images, each representing one product within a group of products with a common composition;

a calculator for calculating a degree of scattering of pixel values at each of the positions in the common composition from a pixel value at each of the positions in each of the received product images;

a generator for generating a filter with a degree of transmittance defined at each of the positions in the common composition, on the basis of a degree of scattering calculated at each of the positions; and an applicator for applying the generated filter to each of the received product images to obtain feature images, each representing a feature of each of the products.

A program according to a fourth aspect of the present invention causes a computer to function as:

a receiver for receiving product images, each representing one product within a group of products with a common composition;

a calculator for calculating a degree of scattering of pixel values at each of the positions in the common composition from a pixel value at each of the positions in each of the received product images;

a generator for generating a filter with a degree of transmittance defined at each of the positions in the common composition, on the basis of a degree of scattering calculated at each of the positions; and an applicator for applying the generated filter to each of the received product images to obtain feature images, each representing a feature of each of the products.

The program in the present invention can be recorded in a computer-readable, non-transitory information recording medium, such as a compact disk, a flexible disk, a hard disk, a magnetic optical disk, a digital video disk, a magnetic tape, and a semiconductor memory.

The above program can be distributed and sold via a transitory medium such as a computer communication network, separately from a computer that executes the program. The above information recording medium can be distributed and sold, separately from a computer.

Effects of the Invention

The present invention can provide a product image processor, a product image processing method, an information recording medium and a program that are suitable for obtaining a feature image representing a feature of a product from a product image.

BRIEF DESCRIPTION OF DRAWINGS

FIG. 9A is an illustration showing curve-fitting of a polygonal line in a histogram; and FIG. 9B is an illustration showing curve-fitting of a polygonal line in a histogram.

MODE FOR CARRYING OUT THE INVENTION

Hereinafter, embodiments of the present invention will be described. The embodiments are only for explanation, and do not limit the scope of the present invention. Accordingly, a person skilled in the art can employ embodiments in which some or all of the elements are replaced by equivalents thereof, and these embodiments are also included in the scope of the present invention.

A product image processor according to the present embodiment is typically realized by executing a predetermined program on a computer, but can also be realized as a dedicated device comprised of an electronic circuit or the like as functions of the respective parts, which will be described below.

Embodiment 1

Figure 1:
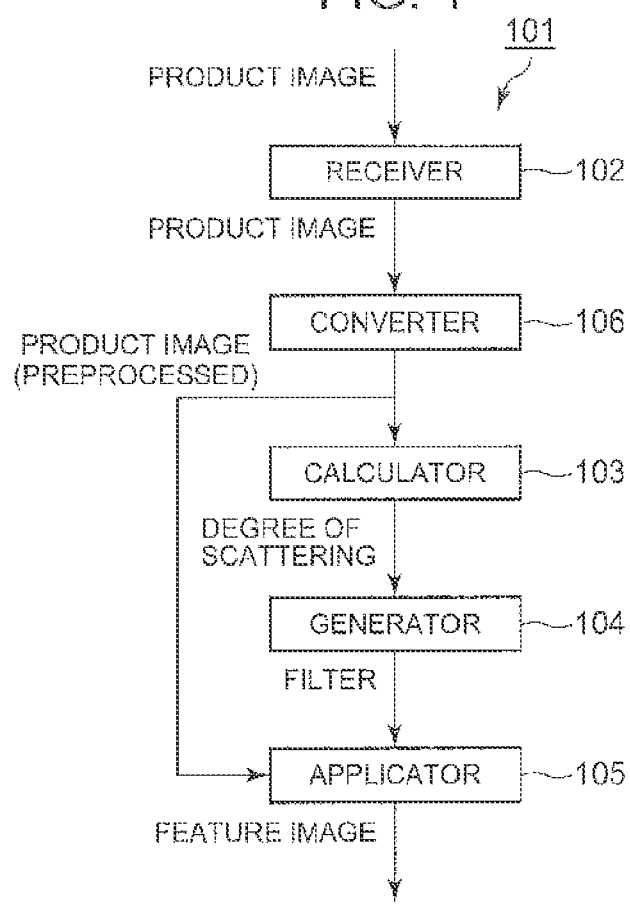
FIG. 1 is a diagram illustrating a schematic configuration of a product image processor according to an embodiment of the present invention.

FIG. 1 is a diagram illustrating a schematic configuration of a product image processor according to the present embodiment. Hereinafter, description will be given with reference to FIG. 1.

A product image processor 101 according to the present embodiment includes a receiver 102, a calculator 103, a generator 104 and an applicator 105. FIG. 1 also illustrates a converter 106, which can be omitted.

The receiver 102 receives product images, each representing one product with a group of products with a common composition.

Figure 2:
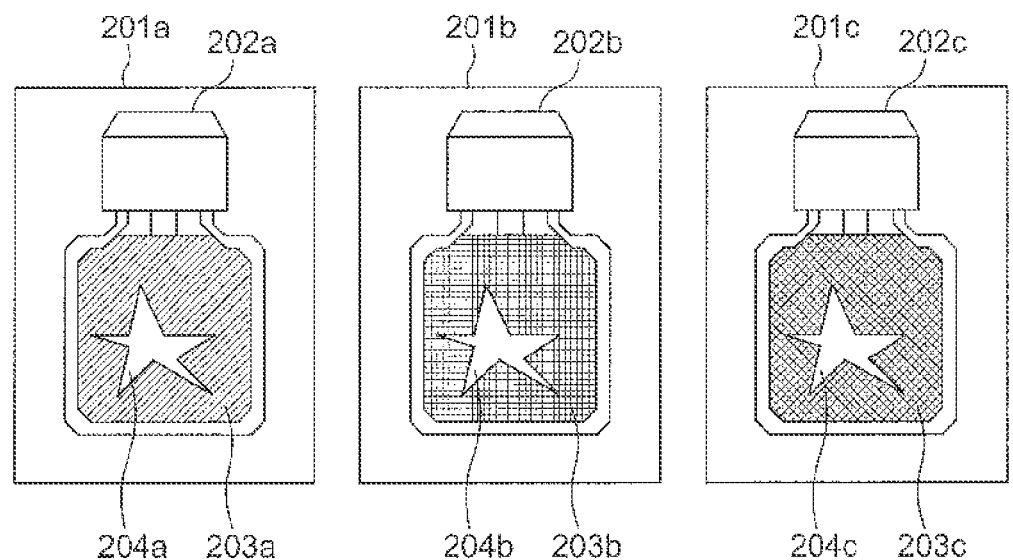
FIG. 2 is an illustration of an example of product images.

FIG. 2 is an illustration of an example of a product image. Hereinafter, description will be given with reference to FIG. 2.

As illustrated in FIG. 2, three pieces of product images 201a, 201b, 201c show appearances of products 202a, 202b, 202c that are different from one another and compose a group of products, respectively. These products 202a, 202b, 202c are assumed to be nail polish belonging to the same series made by the same manufacturer.

Hereinafter, when elements are generically referred to reference numerals whose endings of "a", "b", "c" and so on are omitted as appropriate.

Where product images 201 are provided from a manufacturer that produces products 202, the positions, orientations and size of the products 202 are usually identical in compositions of the product images 201.

Meanwhile, where a shopkeeper selling the products 202 photographs the products 202 with a digital camera or the like, the position, orientations and sizes of the products 202 usually vary in compositions of photographed images.

In such a case, if preprocessing is performed in which feature points of the products 202 are extracted from photographed images to associate the feature points in the images with one another for performing transformation such as affine transformation, the positions, orientations and sizes of the products 202 in resulting images can be identical as much as possible. Such affine transformation can be found, for example, by using a least-squares method that minimizes deviation of positions of feature points and shift of affine transformation from a unit matrix.

Accordingly, by providing the converter 106 to perform such preprocessing between the receiver 102 and the calculator 103, the product images 201 that are suitable to be processed by the calculator 103 can be obtained.

If preprocessing to commonalize compositions of the product images 201 to be received by the receiver 102 has been already performed, the product images 201 can be directly passed from the receiver 102 to the calculator 103 without the converter 106.

The products 202 in FIG. 2 are provided in a bottle shape. Contents 203a, 203b, 203c in bottles of the products 202a, 202b, 202c are different in colors from one another. In FIG. 2, this difference of colors is represented by presence or absence of hatching and a density of hatching.

Additionally, on surfaces of bottles of the products 202, common logos 204 are arranged.

In FIG. 2, for easier understanding, the products 202, contents 203 in bottles, and the logos 204 are outlined, but in a case where the product images 201 are obtained by photographing, these outlines do not generally exist.

Each of the products 202 is disposed using a common composition in each of the product images 201. In the present embodiment, each of the product images 201 is represented by a set of pixels of W horizontal dots×H vertical dots.

Hereinafter, for easier understanding, the n-th product image 201 is expressed by img[n] in such a way that the product image 201a, the product image 201b and the product image 201c are expressed by img[0], img[1] and img[2], respectively. Where the total number of the product images 201 is N, the product images are expressed by img[0], img[1], . . . , img [N−1], respectively.

Furthermore, in the product image 201, img[n], a pixel value of a pixel disposed at a horizontal position x ($0 \leq x < W$) and at a vertical position y ($0 \leq y < H$) is expressed by img[n](x,y).

Where the product images 201 are represented by 24-bit color, one pixel value, img[n](x,y) is represented as 3-byte data. Therefore, hereinafter, a red component, a green component and a blue component of the pixel value img[n](x,y) are expressed by img[n](x,y).r, img[n](x,y).g and img[n](x,y).b, respectively.

In 24-bit color, any of img[n](x,y).r, img[n](x,y).g and img[n](x,y).b takes an integer from 0 to 255.

In 15-bit color, a pixel value img[n](x,y) is represented as 15-bit data, and is typically stored in a 2-byte region. In this case, any of img[n](x,y).r, img[n](x,y).g and img[n](x,y).b takes an integer from 0 to 31.

In the present invention, if a distance between pixel values can be calculated, various types of numerical representation of a pixel value can be employed. That is, various types of color representation, such as CMY (Cyan, Magenta, Yellow) representation based on subtractive color mixing, and HSV (Hue, Saturation, Brightness Value) representation composed of a hue, saturation and a brightness value, can be employed, rather than the above RGB (Red, Green, Blue) representation. A bit number of data representing a color can be changed as appropriate.

The product images 201 are typically received in an electronic file format, such as BMP (BitMap Picture format) and JPEG (Joint Photographic Experts Group). Where the product images 201 are received in a compressed format such as JPEG, each pixel img[n](x,y) of the product images 201 can be acquired by decompressing the data.

The present embodiment employs a rectangular composition of W horizontal dots×H vertical dots. However, a shape of the product images 201 is not limited to a rectangular shape and can be employed in any shape as long as each pixel included in the product images 201 can be placed in a predetermined order, and the order is associated with positions in the composition in one-to-one relation.

The calculator 103 calculates a degree of scattering of pixel values at each of positions in the common composition from a pixel value at each of the positions in each of the received product images 201.

In the present embodiment, img[0], img[1], . . . , img[N−1] are received as the product images 201. Positions in the composition are represented by all pairs of x and y ($0 \leq x < W$, $0 \leq y < H$). These pairs are W×H in total.

The calculator 103 acquires N pieces of pixel values, img[0](x,y), img[1](x,y), . . . , img[N−1](x,y) at each of positions (x,y) in the composition, and calculates a degree of scattering of these pixel values.

Here, a degree of scattering is a concept widely known in statistics, and an amount that indicates a degree of diffusion of sample values, that is, to what degree sample values are not dense. A commonly-used degree of scattering includes:

(1) variance: a square average of a difference between each sample value and an average of sample values;

(2) standard deviation: a square root of a variance;

(3) range: a difference between a minimum value and a maximum value of each sample value; and (4) a maximum value of a difference between each sample value and an average of sample values.

In the present embodiment, pixel values are represented by RGB representation. An average ave(x,y) of pixel values at a certain position (x,y) is calculated as follows:

$$ave(x,y).r = \sum_{n=0}^{N-1} img[n](x,y).r/N;$$

$$ave(x,y).g = \sum_{n=0}^{N-1} img[n](x,y).g/N;$$

$$ave(x,y).b = \sum_{n=0}^{N-1} img[n](x,y).b/N$$

A difference between two pixel values P, Q can be represented by a distance between the two pixel values in color space. As a distance between pixel values P, Q, dist(P,Q), for example, Euclidean distance $$dist(P,Q) = [(P.r - Q.r)^2 + (P.g - Q.g)^2 + (P.b - Q.b)^2]^{1/2}$$

and Manhattan distance $$dist(P,Q) = |P.r - Q.r| + |P.g - Q.g| + |P.b - Q.b|$$

can be used, and various color distances defined based on a definition of color space can also be employed.

Then, a variance var(x,y) and a standard deviation sdev(x,y) at a certain position (x,y) can be calculated as follows:

$$var(x,y) = \sum_{n=0}^{N-1} dist(img[n](x,y), ave(x,y))^2/N;$$

$$sdev(x,y) = var(x,y)^{1/2}$$

Moreover, a range, range(x,y), and a maximum value maxdist(x,y) of a difference from an average can be calculated as follows:

$$range(x,y) = \max_{i=0}^{N-1} dist(img[i](x,y), ave(x,y)) - \min_{i=0}^{N-1} dist(img[i](x,y), ave(x,y));$$

$$maxdist(x,y) = \max_{i=0}^{N-1} dist(img[i](x,y), ave(x,y))$$

In this way, as a degree of scattering sca(x,y) at a certain position (x,y), var(x,y), sdev(x,y), range(x,y), maxdist(x,y) or the like can be employed.

A degree of scattering sca(x,y) obtained here is 0 in a case where all pixel values img[0](x,y), img[1](x,y), ..., img[N−1](x,y) are identical; and the more different all pixel values are, the greater a degree of scattering sca(x,y) becomes.

Accordingly, when a degree of scattering sca(x,y) is great, a difference at a position (x,y) between the product images 201 representing products 202 whose appearances are similar to one another is also great. That is, a position (x,y) whose degree of scattering sca(x,y) is great can be a candidate of a position of a feature of each product.

In addition, since pixel values in the present embodiment employ RGB representation, a maximum value and a minimum value for pixel values cannot be obtained directly. Therefore, an approach may be employed in which distances between pixel values that correspond to ranges are found as described above, and a maximum value of the distances is employed as a degree of scattering.

That is, $$range'(x,y) = \max_{i=0}^{N-1} \sum_{j=i+1}^{N-1} dist(img[i](x,y), img[j](x,y))$$

is used.

Figure 3:
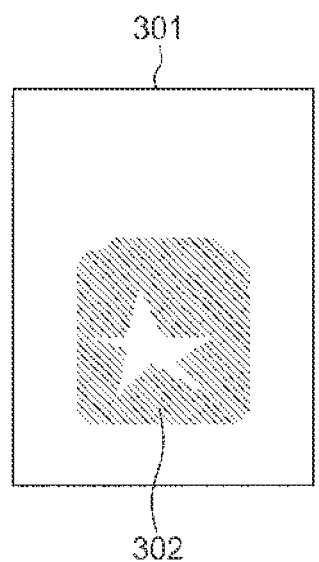
FIG. 3 is an illustration of a degree of scattering of a product image.

FIG. 3 is an illustration of a degree of scattering of the product images 201 illustrated in FIG. 2. Description will be given with reference to FIG. 3.

In FIG. 3, within a frame border 301 indicating a whole composition, degrees of scattering are represented in such a way that a region where a degree of scattering is 0 is represented in white and a high-scattering region 302 is represented by hatching.

The high-scattering region 302 corresponds to a region where nail polish, which are the contents 203 of the products 202, can be seen in FIG. 2. Another region is represented in white since the region is common in all of the products 202.

Here, in nail polish contained in the same-shape bottles, colors of the nail polish that can be seen through the bottles are considered to be feature portions of the nail polish.

Another example will be discussed. In various tastes of mayonnaise contained in the same-shaped bottles, portions indicating tastes, such as ". . . flavor" written in labels, correspond to feature portions of the mayonnaise. These portions have different pixel values in the product images 201. Accordingly, feature portions of mayonnaise are considered to have a high degree of scattering, sca(x,y).

In the present embodiment, a portion where the degree of scattering sca(x,y) is great, that is, a portion of hatching in an example in FIG. 3 is estimated to be a feature portion of each of the products 202 in each of the product images 201.

Then, the generator 104 generates a filter with a degree of transmittance defined at each of the positions in the common composition, on the basis of a degree of scattering calculated at each of the positions.

In the present embodiment, the degree of transmittance trans(x,y) at the position (x,y) of the filter uses a monotone increasing function minc(.), and can be represented by:

$$trans(x,y) = minc(sca(x,y))$$

In a simplest filter, in a case where the degree of scattering sca(x,y) is 0 at each position (x,y) in the composition, the degree of transmittance is not transmissive (a degree of transmittance is 0); and in a case where the degree of scattering sca(x,y) is not 0, the degree of transmittance is completely transmissive (a degree of transmittance is 1). In this case, a monotone increasing function minc(s) can be represented by:

$$minc(s) = 0 \quad (s = 0);$$
$$\quad\quad\quad = 1 \quad (s \neq 0)$$

A filter can be also employed that uses a threshold value, p, to set less than p to be non-transparent and greater than or equal to, p, to be completely transparent. In this case, a monotone increasing function is as follows:

$$minc(s) = 0 \quad (s < p);$$
$$\quad\quad\quad = 1 \quad (s \geq p)$$

An approach to define the threshold value, p, will be described in Embodiment 3.

In addition, a maximum value $\max_{0 \leq x < W, 0 \leq y < H} sca(x,y)$ of a degree of the scattering sca(x,y) or a theoretical upper limit, U, of the degree of scattering sca(x,y) can be used to provide a monotone increasing function that includes translucence as a degree of transmittance such as $$minc(s) = s / [\max_{0 \leq x < W, 0 \leq y < H} sca(x,y)]$$

or $$minc(s) = s/U.$$

In 24-bit color, an upper limit in Euclidean distance is $U = 255 \times 3^{1/3} \approx 442$; and an upper limit in Manhattan distance is $U = 255 \times 3 = 765$. Similarly, in 15-bit color, an upper limit in Euclidean distance is $U = 31 \times 3^{1/3} \approx 54$; and an upper limit in Manhattan distance is $U = 31 \times 3 = 103$.

A filter generated here transmits a pixel at each position (x,y) with a degree of transmittance, minc(sca(x,y)), in an image of W horizontal dots×H vertical dots.

The degree of transmittance, minc(sca(x,y)), plays a role similar to the role of a so-called α value. Since in an α value, 0 is completely transparent in general, and 1 or an upper limit is completely translucent, the α value and the degree of transmittance in the present embodiment have a complementary relationship therebetween.

Where the degree of transmittance, minc(sca(x,y)) is either 0 or 1, the above filter can be represented by W×H bits.

Where the degree of transmittance is represented by 256-level fixed points, the fixed points are typically prorated in such a way that a byte value 0 indicates a degree of transmittance 0; a byte value 255 indicates a degree of transmittance 1, and a byte value t indicates a degree of transmittance t/255.

Then, the applicator 105 applies the generated filter to each of the received product images 201, thereby obtaining feature images, each representing a feature of each of the products.

As described above, N pieces of img[0], img[1], . . . , img[N−1] of the product images 201 are received. Then, for an integer, n, that fulfills 0≤n<N, a feature image res[n] is obtained by applying the above filter to the n-th img[n].

In the present embodiment, the feature image, res[n], has the same size of W horizontal dots×H vertical dots as those of the product images 201.

The applicator 105 applies the above filter, for each n of 0≤n<N, as described below. Here, a pixel value, C, indicates a color of a mask for performing filtering.

$$res[n](x,y).r = minc(sca(x,y)) \times img[n](x,y).r + [1 - minc(sca(x,y))] \times C.r;$$

$$res[n](x,y).g = minc(sca(x,y)) \times img[n](x,y).g + [1 - minc(sca(x,y))] \times C.g;$$

$$res[n](x,y).b = minc(sca(x,y)) \times img[n](x,y).b + [1 - minc(sca(x,y))] \times C.b$$

If a degree of transmittance minc(sca(x,y)) is either 0 or 1, either one of C or img[n](x,y) can be used as a pixel value, res[n](x,y). Accordingly, in this case, the above multiplication is not required.

Figure 4:
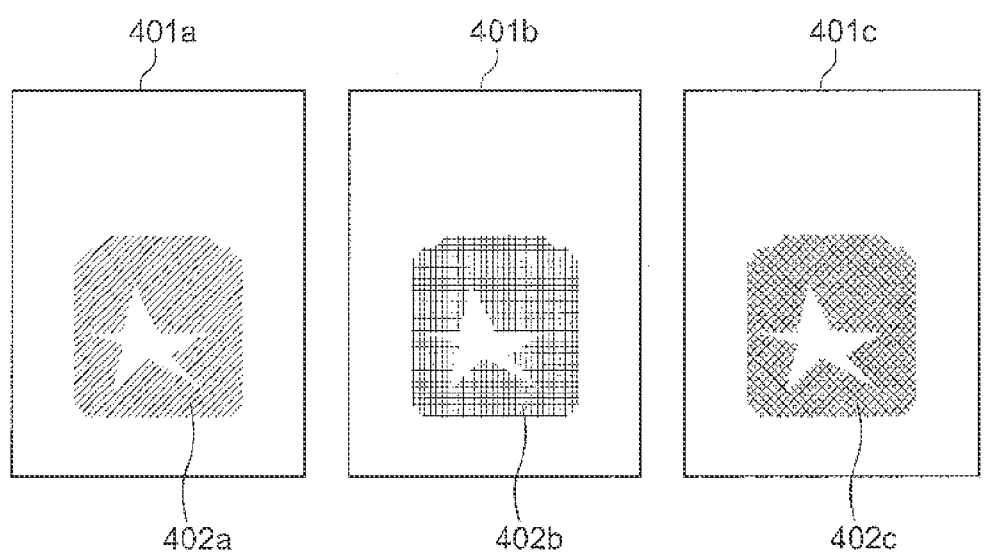
FIG. 4 is an illustration of feature images.

FIG. 4 is an illustration of feature images obtained by applying the above filter to the product images 201. Description will be given with reference to FIG. 4.

As illustrated in FIG. 4, only portions 402a, 402b, 402c where nail polish in bottles can be seen are extracted in feature images 401a, 401b, 401c. The extracted portions 402a, 402b, 402c have the same colors as colors of the contents 203a, 203b, 203c in bottles. In this way, colors of nail polish, that is, feature images 401 representing features of the products 202 can be obtained.

In the above embodiment, a degree of transmittance, trans(x,y), at a position (x,y), is decided by referring to only a scattering, sca(x,y), at the position (x,y). However, in a case where the product images 201 include various noises, it is often better to perform smoothing.

For performing such smoothing, for example, an approach to have a (weighted) average of the left, right, top and bottom, and the center can be employed as follows:

$$trans(x, y) = minc([sca(x, y) \times 4 + sca(x - 1, y) + sca(x + 1, y) + sca(x, y - 1) + sca(x, y + 1)]/8)$$

$$trans(x, y) = minc([sca(x, y) + sca(x - 1, y) + sca(x + 1, y) + sca(x, y - 1) + sca(x, y + 1)]/5)$$

or

Where the position (x,y) is at an outermost periphery of an image, that is, where the left, right, top or bottom of the position (x,y) is outside a range of the image since at least one of x=0, y=0, x=W−1, y=H−1 is fulfilled, sca(x,y) or a value 0 or the like may be employed as a value of the position outside the image.

Various arts such as a denoising filter and a high-frequency component removal filter in image processing can be applied as-is to such smoothing. For example, a monotone increasing function may be applied after finding a weighted average of not only the left, right, top and bottom of a position (x,y) but also a certain range around the position (x,y).

Further, where a monotone increasing function is employed that returns a value between 0 and 1 as a result, feature portions are drawn in colors similar to colors of original product images 201, and similar portions are drawn in color similar to color of a pixel value C in the feature images 401. Accordingly, smoothing is performed only by employing such a monotone increasing function.

Hereinafter will be described procedures of processing where the product image processor 101 is realized by a computer that executes a program.

Figure 5:
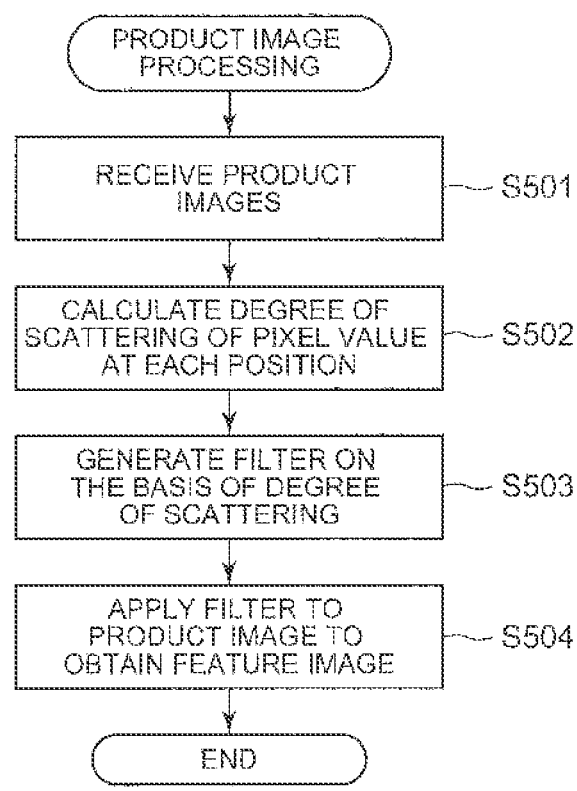
FIG. 5 is a flow chart illustrating a procedure of product image processing.

FIG. 5 is a flow chart illustrating procedures of product image processing to be performed by the product image processor 101. Hereinafter, description will be given with reference to FIG. 5.

A product image processing method according to the present embodiment is started when a computer reads out a program from a non-transitory information recording medium, or when a computer obtains a program via a transmission medium such as a signal line and starts interpretive execution of the program.

Here, a CPU (Central Processing Unit) controls the computer, and a RAM (Random Access Memory) stores a program, temporary data and so on.

When this processing is started, the receiver 102 first receives the product images 201 (Step S501).

A reader reads out data from one of various memory cards, a network interface card reads out data from a communication network or the like, or the CPU controls a hard disk or the like that stores the product images 201 to read out data, thereby realizing the processing.

Received information of the product images 201 is stored in the RAM (Random Access Memory) or the like for being subjected to processing described below.

Next, the calculator 103 calculates a degree of scattering at each position in the product images 201 (Step S502). The generator 104 generates a filter (Step S503).

These calculation and generation are performed by the CPU, an image processing calculation coprocessor and/or the like on the basis of data of the product images 201 stored in the RAM. A degree of scattering at each position that is obtained by calculation is temporarily stored in the RAM, and a filter is generated on the basis of the degree of scattering, and is stored in the RAM.

Finally, the applicator 105 applies the filter to the product images 201 to obtain the feature images 401 (Step S504), then the processing is terminated.

The application processing is performed by the CPU, image processing calculation coprocessor and/or the like on the basis of data of the product images 201 and data of the filter stored in the RAM.

The resulting feature images 401 are temporarily outputted to the RAM, and then saved in a memory card, a hard disk and/or the like, or transmitted outside via a communication network.

The product image processor 101 can be realized by a dedicated hardware using an electronic circuit. It is possible that the same algorithm as that of the present embodiment is written as a program, the program is compiled to configuration information of an electronic circuit, and an FPGA (Field Programmable Gate Array) is then used to configure an electronic circuit.

In this way, according to the present embodiment, the feature images 401, which extract feature portions of products or highlight the feature portions, can be obtained from the product images 201 by simple calculation. Additionally, obtaining the feature images 401 in which feature portions are extracted, for example, allows easier comparison among the product images 201.

Hereinafter, a variation of the present embodiment will be described.

Embodiment 2

In the filter according to the above embodiment, the product images 201 and the feature images 401 are configured by the same number of horizontal and vertical dots. In a filter according to the present embodiment, clipping is performed that clips portions of the product images 201, and the number of horizontal and vertical dots of the feature images 401 is less than the numbers of horizontal and vertical dots of the product images 201.

For example, where a product is presented to a purchaser through web-mail order, the product images 201 may be displayed as-is on a screen for showing product details, and the product images 201 may be reduced to the identical size and displayed as icons in a table or a list so that a user can compare products. However, simple reduction in size often makes a difference among products less noticeable.

Therefore, in the present embodiment, a filter is configured that clips portions of the product images 201 on the basis of a degree of scattering.

Hereinafter, as the feature images 401, those of K horizontal dots×J vertical dots are assumed. That is, a clipping region has also a size of K horizontal dots×J vertical dots.

Figure 6:
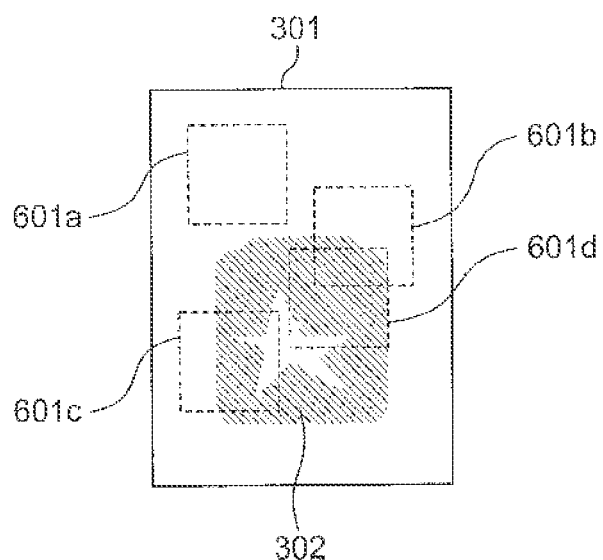
FIG. 6 is an illustration of a degree of scattering and clipping regions.

FIG. 6 is an illustration of a degree of scattering and clipping regions. Hereinafter, description will be given with reference to FIG. 6.

As with FIG. 3, a high-scattering region 302 exists within a frame border 301 indicating the whole composition in FIG. 6. In this composition, as an example, four clipping regions 601a, 601b, 601c, 601d, all having the same size, are disposed. Outlines of clipping regions 601 are shown by dotted lines.

The clipping region 601a does not overlap the high-scattering region 302.

Part of the lower left portion of the clipping region 601b overlaps the high-scattering region 302.

The right half portion of the clipping region 601c overlaps the high-scattering region 302.

Most of the clipping region 601d overlaps the high-scattering region 302.

Accordingly, of the four clipping regions 601a, 601b,1 601c, 601d, the clipping region 601d is considered to best extract a feature of a product.

Generally, when a start position (f,g) of clipping within compositions of the product images 201 is provided, a pixel value res[n](x,y) at a position (x,y) in the feature images 401 can be represented by:

res[n](x,y)=img[n](x+f,y+g)

where $0 \leq x < K$, $0 \leq y < J$ in the feature images 401.

In the present embodiment, a start position (f,g) is decided based on a degree of scattering. Here, since the degree of scattering indicates to what degree a portion is assumed to be a feature portion, the start position (f,g) is may be obtained so as to maximize an evaluation function, $$\phi(f,g) = \sum_{x=0}^{K-1} \sum_{y=0}^{J-1} \text{img}[n](x+f, y+g).$$

Therefore, in the present embodiment, the generator 104 calculates an evaluation function, φ(f,g), for each (f,g) of $0 \leq f < W-K$, $0 \leq g < H-J$, and employs (f,g) where the greatest calculation result is obtained, as a start position of clipping.

In a case where the evaluation function φ(f,g) is calculated for each (f,g) of $0 \leq f < W-K$, $0 \leq g < H-J$, a large amount of calculation is necessary. In this case, an evaluation function φ(f,g) may be calculated at every K interval or at every K/2 interval for f and at every J interval or at every J/2 interval for g, and a start point (f,g) may be selected from skipped candidates.

Figure 7:
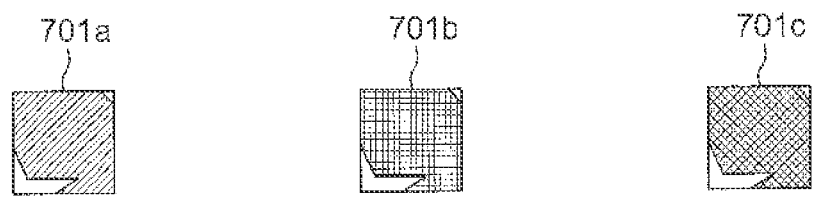
FIG. 7 is an illustration of feature images.

FIG. 7 is an illustration of feature images obtained by using a filter that employs clipping. Hereinafter, description will be given with reference to FIG. 7.

Feature images 701 in FIG. 7 having frame borders are clearly shown.

These feature images 701a, 701b, 701c correspond to the feature images 401a, 401b, 401c shown in FIG. 4, respectively, and the feature images 701 are smaller in size than the feature images 401.

In the feature images 401a, 401b, 401c in FIG. 4, pixels of original product images 201a, 201b, 201c are subjected to alteration whereas the feature images 701a, 701b, 701c in FIG. 7 are obtained by clipping parts of the original product images 201a, 201b, 201c as-is.

That is, a filter employing clipping according to the present embodiment defines which position is transmissive and which position is not transmissive in product images on the basis of degrees of scattering in the above embodiment, and furthermore, defines a position of a clipping region in the composition so that a transmissive area is maximized.

After a clipping region is decided, the region may be clipped as-is from the original product image 201 as illustrated in FIG. 7, or both types of transmittance processing as described above and clipping processing may be applied.

The feature images 701 obtained in the present embodiment are feature portions clipped from the product images 201 in small size. Where the products 202 in the product images 201 are listed, the feature images 701 are appropriately utilized in the same, enlarged or reduced size instead of or in addition to icons of the product images 201 reduced in size, thereby making it possible to present features of the products to a user simply.

The present embodiment can be used together with the above embodiment.

For example, it is possible to generate a filter that performs transmittance processing according to Embodiment 1 and then performs clipping according to Embodiment 2, and to use the filter to obtain feature images from the product images 201. In this case, highlighting and extraction of feature portions are simultaneously performed.

Embodiment 3

The present embodiment utilizes a histogram of degrees of scattering of the product images 201 to adaptively define a monotone increasing function.

Figure 8A:
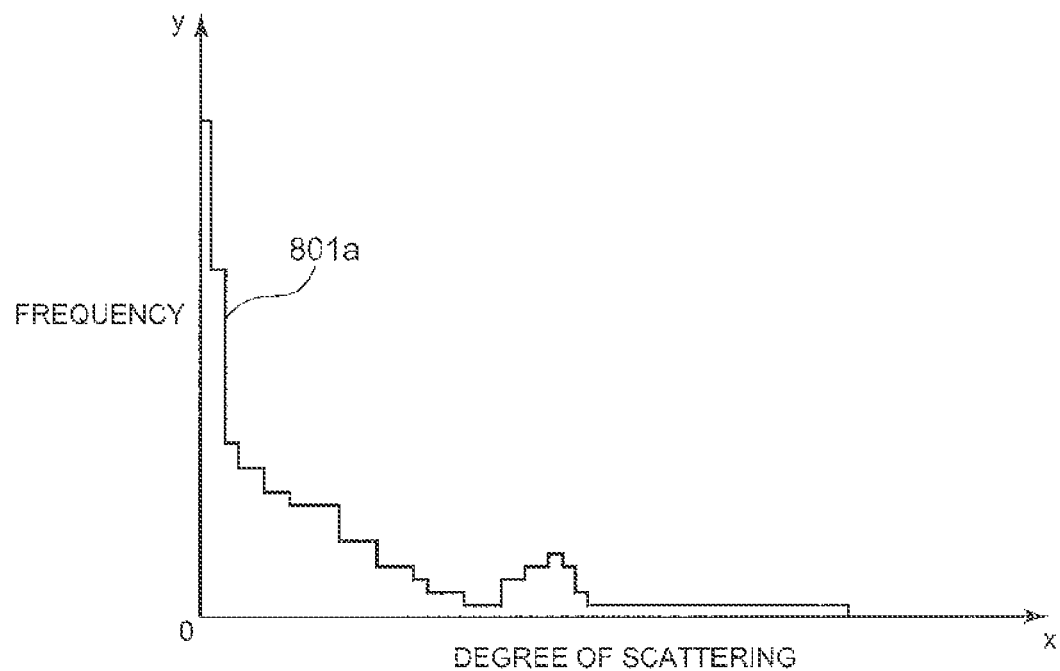
FIG. 8A is a histogram illustrating a distribution of degrees of scattering calculated for product images of a group of products.
Figure 8B:
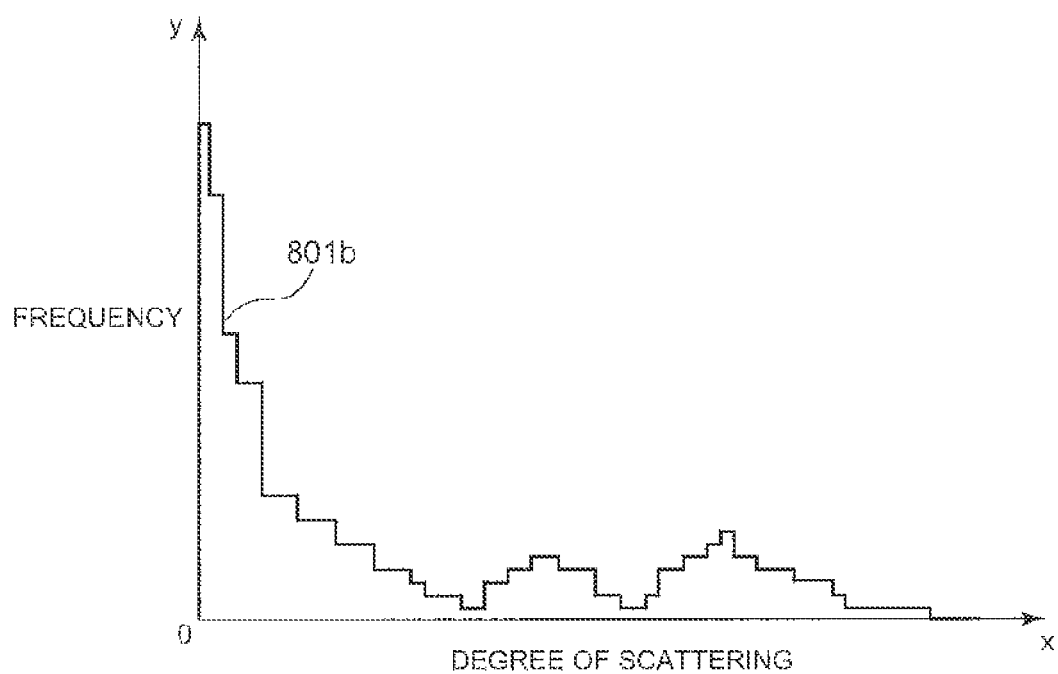
FIG. 8B is a histogram illustrating a distribution of degrees of scattering calculated for product images of a group of products.

FIGS. 8A and 8B are histograms, each representing a distribution of degrees of scattering calculated for a certain group of product images. Hereinafter, description will be given with reference to FIGS. 8A and 8B. In FIGS. 8A and 8B, a horizontal axis (x axis) indicates degrees of scattering; and a vertical axis (y axis) indicates frequency As clearly shown in these FIGS, in histograms 801, y reaches a high peak around x=0, decreases as x increases, then reaches several peaks, and finally decreases onto an x axis.

Where a product is photographed, even when the same product is photographed a plurality of times, an identical product image cannot be obtained due to noise in photographing. In this case, assuming that noise is normally distributed, a degree of scattering is considered to follow chi-square distribution in which the degree of scattering is maximum at x=0 and then attenuates.

Meanwhile, where images are obtained by photographing a group of similar products, a peak due to different portions of products appears while x is increasing. This peak is considered to be similar to normal distribution.

While x is increasing, one peak appears in FIG. 8A and two peaks appear in FIG. 8B. It can be considered that degrees of scattering before these peaks appear, represent a common portion of products; and degrees of scattering after these peaks represent feature portions of the products.

Here, a shape of a histogram is approximated by a polygonal line that has six fitting parameters A, B, C, p, q, r and passes through coordinates (0,A), (p,B), (q,C), (r,0), (∞,0) in this order.

FIGS. 9A and 9B are illustrations in which polygonal lines are curve-fitted to histograms 801$a$, 801$b$ shown in FIGS. 8A and 8B, respectively. Description will be given with reference to FIGS. 9A and 9B.

In FIGS. 9A and 9B, for easier understanding, histograms 801 are represented by dotted lines; and polygonal lines 802 approximating the histograms 801 are represented by solid lines.

As illustrated in FIGS. 9A and 9B, when a least-square method is used to perform curve-fitting of the polygonal lines 802 to the histograms 801 to identify the parameters A, B, C, p, q, r, the first minimum point (p,B) of the polygonal lines 802 are close to the first minimum point 803 of the histograms 801.

Therefore, in generating a filter, a degree of scattering p at a separation point between a common portion and feature portion in the products can be adaptively decided by utilizing a monotone increasing function:

$$minc(s) = 0 \quad (s < p);$$
$$= 1 \quad (s \geq p)$$

A curve for curve-fitting is not limited to the above polygonal line and a curve generally represented by $$y = f(x)$$

where y is maximum at x=0 and minimum at x=p, and y→0 at x→∞ can be employed.

Fitting parameters that decide a shape of such a curve are adjusted by a least-square method, and the curve is fitted to a histogram to decide the degree of scattering p at a separating point between a common portion and feature portions in products.

For example, under the above assumption, a curve can be obtained by adding one or more normal distribution to chi-square distribution. In this case, fitting parameters include the size and expansion of chi-square distribution, the position, size and expansion of normal distribution and the like.

A curve represented by a linear sum of a function representing a curve that is gradually attenuating and a function having a peak may be subjected to curve fitting, thereby finding the first minimum point.

Besides the first minimum point, the second or later minimum points may be employed which are selected as candidates of the threshold value p, then to present candidates of feature images to a user for selecting a feature image.

According to the present embodiment, simple calculation can adaptively separate a common portion of products from feature portions of the products in product images.

INDUSTRIAL APPLICABILITY

The present invention can provide a product image processor, a product image processing method, an information recording medium, and a program that are suitable for obtaining feature images from product images, each of the feature images representing a feature of each product.

DESCRIPTION OF REFERENCE NUMERALS

101 Product image processor
102 Receiver
103 Calculator
104 Generator
105 Applicator
106 Converter
201 Product image
202 Product
203 Content
204 Logo
301 Frame border
302 High-scattering region
401 Feature image
601 Clipping region
701 Feature image
801 Histogram
802 Polygonal line
803 First minimum point in histogram

The invention claimed is:

1. A product image processor comprising:
a receiver for receiving product images, each representing one product of a group of products with a common composition;
a calculator for calculating a degree of scattering of pixel values at each position in the common composition from a pixel value at each of the positions in each of the received product images;
a generator for generating a filter with a degree of transmittance defined at each of the positions in the common composition on the basis of the degree of scattering calculated at each of the positions; and
an applicator for applying the generated filter to each of the received product images, thereby obtaining feature images, each representing a feature of each of the products;
wherein the generator disposes a rectangular region of a predetermined size in the common composition so that a sum of degrees of scattering in the rectangular region is maximized, and the filter clips the rectangular region.

2. The product image processor according to claim 1, wherein
the degree of scattering is a standard deviation, a variance, a maximum value, or a difference between a maximum value and a minimum value, of a distance between each of the pixel values at the position and an average of the pixel values, or a maximum value of distances between pixel values at the position.

3. The product image processor according to claim 1, wherein the generator sets, as a degree of transmittance at each of the positions in the common composition, a result obtained by applying a monotone increasing function to the degree of scattering calculated at each of the positions.

4. The product image processor according to claim 3, wherein the generator smoothes the degree of scattering calculated at each of the positions in the common composition with the use of the filter, and then applies the predetermined monotone increasing function to the degree of scattering.

5. The product image processor according to claim 1, wherein the generator performs curve-fitting so as to fit a curve to a histogram of the degrees of scattering, the curve represented by:

$$y = f(x)$$

where y is at maximum at x=0 and at minimum at x=p, and y→0 at x→∞, and the generator applies a monotone increasing function to the degree of scattering calculated at each of the positions in the common composition in such a way that in a case where an argument is less than p, an application result is 0 and in a case where an argument is greater than or equal to p, an application result is 1, and sets the application result to be a degree of transmittance at the position.

6. The product image processor according to claim 5, wherein the curve is a polygonal line that passes through coordinates (0,A), (p,B), (q,C), (r,0), (∞, 0) in this order, and the generator performs the curve fitting, using A, B, C, p, q, r as fitting parameters.

7. The product image processor according to claim 1, further comprising:

a converter for extracting feature points of the received product images to associate the extracted feature points among the product images, and subject the product images to affine transformation so as to minimize a degree of scattering of the associated feature points at the position in the composition, wherein calculation by the calculator is performed on the product images that were subjected to the affine transformation.

8. A product image processing method, executed by at least one processor, the method comprising:

receiving, using said at least one processor, product images, each representing one product in a group of products with a common composition;

calculating, using said at least one processor, a degree of scattering of pixel values at each of the positions in the common composition from a pixel value at each of the positions in each of the received product images;

generating, using said at least one processor, a filter with a degree of transmittance defined at each of the positions in the composition on the basis of the degree of scattering calculated at each of the positions; and applying, using said at least one processor, the generated filter to each of the received product images, thereby obtaining feature images, each representing a feature of each of the products;

wherein the generating comprises disposing, using said at least one processor, a rectangular region of a predetermined size in the common composition so that a sum of degrees of scattering in the rectangular region is maximized, and the filter clips the rectangular region.

9. A non-transitory computer-readable information recording medium that has a program recorded thereon, the program causing a computer to:

receive product images, each representing one of products in a group of products with a common composition;

calculate a degree of scattering of pixel values at each of the positions in the common composition from a pixel value at each of the positions in each of the received product images;

generate a filter with a degree of transmittance defined at each of the positions in the common composition on the basis of the degree of scattering calculated at each of the positions; and apply the generated filter to each of the received product images, thereby obtaining feature images, each representing a feature of each of the products;

wherein the generating comprises disposing a rectangular region of a predetermined size in the common composition so that a sum of degrees of scattering in the rectangular region is maximized, and the filter clips the rectangular region.

* * * * *